United States Patent [19]

Ohi et al.

[11] Patent Number: 4,909,847

[45] Date of Patent: Mar. 20, 1990

[54] DENTAL INVESTMENT COMPOSITIONS IN LOW-DUSTING POWDERY FORM

[75] Inventors: Nobukazu Ohi, Fuchu; Hiroshi Kamohara, Tokyo; Shunichi Futami, Nagareyama, all of Japan

[73] Assignee: G-C Dental Industrial Corp., Tokyo, Japan

[21] Appl. No.: 233,914

[22] Filed: Aug. 18, 1988

Related U.S. Application Data

[63] Continuation of Ser. No. 20,583, Feb. 19, 1987, abandoned.

[30] Foreign Application Priority Data

Mar. 12, 1986 [JP] Japan .................................. 61-52622

[51] Int. Cl.$^4$ .......................... A61C 9/00; B28B 2/34; C04B 24/00
[52] U.S. Cl. .................................. 106/38.35; 106/35; 106/383; 106/109; 106/110; 106/111; 164/DIG. 4; 433/199.1; 433/213; 433/214
[58] Field of Search ................. 106/35, 109, 110, 111, 106/38.3, 38.35; 164/DIG. 4; 433/214, 213, 199.1

[56] References Cited

U.S. PATENT DOCUMENTS

| | | | |
|---|---|---|---|
| 3,850,870 | 11/1974 | Kawakami et al. | 523/109 |
| 3,947,285 | 3/1976 | Jones et al. | 106/109 |
| 3,966,479 | 6/1976 | Koblitz | 106/109 |
| 4,394,172 | 7/1983 | Scheuble et al. | 106/35 |
| 4,478,641 | 10/1984 | Adair et al. | 106/38.3 |
| 4,526,619 | 7/1985 | Otti et al. | 106/109 |
| 4,543,372 | 9/1985 | Watanabe et al. | 433/214 |
| 4,604,142 | 8/1986 | Kamohara et al. | 106/35 |
| 4,661,071 | 4/1987 | Bell et al. | 433/222.1 |
| 4,662,924 | 5/1987 | Kobayashi et al. | 501/10 |
| 4,670,053 | 6/1987 | Kooke et al. | 106/209 |

*Primary Examiner*—Prince E. Willis
*Assistant Examiner*—Linda D. Skaling
*Attorney, Agent, or Firm*—Oblon, Spivak, McClelland, Maier & Neustadt

[57] ABSTRACT

A dental investement composition in the low-dusting powdery form contains (a) a mixture of a soluble phosphate with magnesium oxide or hemihydrate gypsum as a binder, (b) quartz and/or christobalite as a refractory material, (c) one or more wetting agents selected from the group consisting of hydrophobic liquid hydrocarbons, liquid hydrophobic fatty acid esters and liquid hydrophobic fatty acids showing a vapor pressure of 3.15 mmHg or below 20° C., and (d) one or more anionic surface active agents selected from the group consisting of alkylbenzene sulfonates and alkyl sulfates.

14 Claims, No Drawings

DENTAL INVESTMENT COMPOSITIONS IN LOW-DUSTING POWDERY FORM

This application is a continuation of application Serial Number 07/020583, filed on Feb. 19, 1987, now abandoned.

BACKGROUND OF THE INVENTION

The present invention relates to a dental investment composition in powdery form, which is used in the preparation of cast restoration materials to be placed in the mouth in the field of dentistry.

STATEMENT OF THE PRIOR ART

Hitherto, dental metal restoration materials have been prepared by the precision investment casting techniques including the lost wax process. Its process is that contour of a restoration material is formed by a wax, then a sprue line (a pouring inlet) is formed thereon, then the thus obtained product is invested, then the sprue line is removed therefrom after the solidification of the investment material, then the wax is burnt off, and then a molten metal is poured into the vacant space of said contour of a restoration material in the investment material by way of a sprue defined by the sprue line. The dental metal restoration materials are required to have high dimensional accuracy, particularly because they are applied in the oral mouth for the purpose of restoring a missing tooth. In order to obtain dental metal restoration materials having high dimensional accuracy, it is required that the shrinkage of metals due to their solidification and cooling be made for, making use of the expansion of the dental investment materials during solidification and heating.

As such dental investment materials, use is widely made of gypsum base investment materials obtained by mixing a refractory material such as quartz and/or christobalite with hemihydrate gypsum serving as a binder and highly heat-resistant phosphate base investment materials obtained by mixing the refractory material with magnesium oxide and soluble phosphate acting as binders. Usually, an operator weighs a powdery investment with a powder meter attached to a container, precisely measures a prescribed corresponding amount of water or a designated liquid to put it into a small bowl made of rubber, and mixes them together with the use of a plaster spatula to form a investment slurry which is, in turn, poured into a casting ring having thereon a wax pattern. Since such a dental investment composition in the powdery form is in a dried state so that it takes long time for water to infiltrate thereinto and give moisture thereto, dusting takes place when it is mixed with water or a designated liquid in a small bowl made of rubber to form an investment slurry. It is also observed that dusting takes places, when emptying that composition from one container to another or weighing it. The resulting dust poses a problem in view of environmental health due to its irritation and harmfulness to the human body, which is pointed out to be one disadvantage of the dental investment compositions in the powdery form.

Hitherto dental investment has another disadvantage that the setting and the thermal expansion of the investment for making up for the shrinkage of a metal transform and the compressive strength of the solidified investment lowers since the setting time and the consistency increase or decrease during storage and the setting expansion and the thermal expansion have a striking influence upon the setting time and the consistency.

SUMMARY OF THE INVENTION

With the foregoing in mind, the present inventors have made extensive and intensive studies for the purpose of developing a dental investment composition in the powdery form, which does not give rise to the occurrence of dusting during use, does not undergo any lowering of quality during storage—this means that it excels in storage stability—, and, once solidified, shows no sign of any lowering of compressive strength. As a result, it has been found that the aforesaid object is achieved by allowing a wetting agent and an anionic surface active agent to be coexistent with a dental investment composition in the powdery form, said composition comprising a refractory material consisting of quartz and/or christobalite and a binder consisting of hemihydrate gypsum or a mixture of soluble phosphate with magnesium oxide.

More specifically, the dental investment compositions in the low-dusting powdery form, according to the present invention, have improved low-dusting properties and storage stability by permitting at least one wetting agent selected from the group consisting of liquid hydrophobic hydrocarbons, liquid hydrophobic fatty acid esters and liquid hydrophobic fatty acids, all showing a vapor pressure of 3.15 mm Hg or below at 20° C. and at least one anionic surface active agent selected from the group consisting of alkyl sulfates and alkylbenzene sulfonates to coexist with a dental investment composition in the powdery form comprising known components a binder consisting of hemihydrate gypsum or a mixture of soluble phosphate with magnesium oxide and a refractory material consisting of quartz and/or christobalite.

DETAILED DESCRIPTION OF THE INVENTION

In what follows, the present invention will be explained in more detail with reference to its preferred but non-restrictive embodiments.

Hemihydrate gypsum or a mixture of soluble phosphate with magnesium oxide acts as a binder, and provides a main constituent of the dental investment composition in the low-dusting powdery form.

If the metal for dental restoration is gold, palladium, silver or like alloys, then use is made of a gypsum base investment material wherein hemihydrate gypsum is used as the binder and quartz and/or christobalite is or are used as the refractory material. Usually, that material is mixed with water. In the case of an alloy having a relatively high melting point such as Ni-Cr or Co-Cr alloys, alloys for metal bond porcelain and the like, on the other hand, use is made of a highly heat-resistant phosphate base investment material wherein a mixture of soluble phosphate with magnesium oxide is used as the binder and quartz and/or christobalite is or are used as the refractory material. Usually, phosphate base investment material is mixed with a colloidal silica.

At least one wetting agent selected from the group consisting of liquid hydrophobic hydrocarbons, liquid hydrophobic fatty acid esters and liquid hydrophobic fatty acids, all showing a vapor pressure of 3.15 mm Hg or below at 20° C. affords low-dusting properties to the dental powdery investment compositions and serves to maintain their storage stability. However, since the wetting agent(s) shows a touch of oily nature for reasons of hydrophobic nature and causes a lowering of the efficiency of kneading manipulation, it needs to be used with an anionic surface active agent.

Referring to concrete examples of the substances used to wet powder particles, its substances are one or more wetting agents selected from the group consisting of liquid hydrophobic hydrocarbons, liquid hydrophobic fatty acid esters and liquid hydrophobic fatty acids, all showing a vapor pressure of 3.15 mm Hg or below at 20° C.

The liquid hydrophobic hydrocarbons to be used include pristane, squalane, liquid paraffin, alpha-olefin oligomer, nonane, decane, undecane, dodecane, tridecane and so on.

The liquid hydrophobic fatty acid esters to be used include isopropyl myristate, isopropyl linoleate, isopropyl palmitate, hexyl laurate, isopropyl isostearate, butyl isostearate, ethyl linoleate, ethyl olive-oleate, cetyl isooctanoate, hexyldecyl myristate, hexyldecyl stearate, isostearyl palmitate, hexyldecyl isostearate, octyldodecyl neodecanoate, diethyl sebacate, diisopropyl sebacate, diisopropyl adipate and so on.

The liquid hydrophobic fatty acids to be used include isostearic acid, oleic acid, linolenic acid, linoleic acid, 2-ethylpentanoic acid, 2-ethylhexanoic acid and so on.

The anionic surface active agent is a component that is effective for removing a touch of oily nature from the aforesaid wetting agent(s) and thereby improving the efficiency of kneading manipulation, and needs be coexistent with the wetting agent(s).

One or more anionic surface active agents should be selected from the group consisting of alkyl sulfates and alkylbenzene sulfonates. Nonionic surface active agents should be added in larger amounts so as to remove a touch of oily nature of liquid hydrophobic hydrocarbons, liquid hydrophobic fatty acid esters and liquid hydrophobic fatty acids. They also tend to lower the compressive strength of investment materials and lead to a fear that a mould may break depending upon the casting pressure of metals at the time of casting, and are therefore unpreferred. Compared with the nonionic surface active agents, the alkyl sulfates and/or alkylbenzene sulfonates can remove a touch of oily nature in smaller amounts and do not give rise to any lowering of compressive strength. This is because they are particularly preferable.

The alkyl sulfates used as the anionic surface active agents include sodium lauryl sulfate, potassium lauryl sulfate, sodium myristyl sulfate, sodium cetyl sulfate, sodium stearyl sulfate and so on. As the alkylbenzene sulfonates use is made of sodium dodecylbenzene sulfonate and so on.

As mentioned above, the wetting agent(s) and the anionic surface active agent(s) serve to prevent the investment powders from dusting and improve the storage stability thereof. In view of the dental investment materials, it is preferred that one or more wetting agents selected from the group consisting of liquid hydrophobic hydrocarbons, liquid hydrophobic fatty acid esters and liquid hydrophobic fatty acids, all showing a vapor pressure of 3.15 mm Hg or below at 20° C., is or are added in an amount ranging from 0.5 to 5.0% by weight, while one or more anionic surface active agents selected from the group consisting of alkylbenzene sulfonates and alkyl sulfates is or are added in an amount ranging from 0.01 to 0.5% by weight, although varying depending upon the amounts of the binder and refractory material applied. If the wetting agent is used in an amount of below 0.5% by weight, then it has no effect upon preventing the investment powders from dusting. However, if the wetting agent is used in an amount exceeding 5.0% by weight, then the setting reaction of the investment composition is inhibited, resulting in a lowering of its compressive strength. If the anionic surface active agent is used in an amount of below 0.01% by weight, it is then impossible to remove a touch of oily nature from the wetting agent. On the other hand, when the anionic surface active agent is used in an amount exceeding 0.5% by weight, there are observed noticeable drops of degassing properties, storage stability and compressive strength after kneading, which result in a considerable lowering of the dental investment's characteristics.

Of the liquids suitably used as the wetting agent(s) for carrying out the present invention, nonane shows the highest vapor pressure of 3.15 mm Hg at 20° C. Use of a liquid having a higher vapor pressure is unpreferred, since its content decreases gradually due to volatilization during storage to such a degree that low-dusting properties disappear. This is the reason why the vapor pressure is limited to 3.15 mm Hg or below in the present invention.

The dental investment compositions in the low-dusting powdery form according to the present invention can comfortably be used with no fear of environmental pollution, since they are substantially free from dusting, when they are carried to a storage vessel, weighed or kneaded. Furthermore, the compositions according to the present invention have considerably improved storage stability and show stable manipulation properties and physical properties even after storage, and therefore provide investment materials, which can be used in a stable manner and, to that end, are required to have high dimensional accuracy.

It is understood that the dental investment compositions in the low-dusting powdery form according to the present invention may contain ordinarily used additives such as setting controlling agents which act as setting accelerator such as inorganic acid salts (NaCl, $K_2SO_4$, etc.) and alkali and finely divided dihydrate gypsum, setting retarders such as borax, sodium carboxylate, colloids, coloring agents, lightening materials and so on.

The present invention will now be further concretely explained with reference to examples. It is understood, however, that such examples are given by way of illustration alone, and do not place any limitation upon the wetting agents and anionic surface active agents used for carrying out the present invention.

EXAMPLES

In the respective examples and comparison examples, mixtures of soluble phosphates with magnesium oxide or hemihydrate gypsum were used as the binders, and quartz and/or christobalite were or was employed as the refractories. The starting materials were placed in a blender for 20-minute blending. Blending was further continued with the dropwise addition, into the blender, of the prescribed amounts of one or more wetting agents selected from the group consisting of the liquid hydrophobic hydrocarbons, liquid hydrophobic fatty acid esters and liquid hydrophobic fatty acids having a vapor pressure of 3.15 mm Hg or below at 20° C. and one or more anionic surface active agents. Mixing was afterwards continued for further 20 minutes, followed by screening with a 100 mesh sieve. Use was made of the powders which passed through that sieve.

The kneading water and liquid ratios in the preparation of gypsum base investment samples were determined according to the testing procedures of the Japanese Industrial Standards-JIS-T 6601 "Dental Casting Investment". One hundred (100) grams of a sample was kneaded indoors at 20° to 25° C. in varied amounts of water at a kneading rate of 100 revolutions per minute for 30 seconds, using a kneading bowl and a spatula. The kneaded investment slurry was charged in a metal-made cylindrical mould of 28 mm in inner diameter and 50 mm in height, placed on a glass plate. Two (2) minutes after the start of kneading, the mould was slowly pulled up from the glass plate, leaving behind the investment slurry. After the lapse of further 1 minute, measurement was made of the maximum and minimum diameter of the portion of the investment slurry coming in contact with the glass plate. The standard consistency was then defined in terms of an averaged value of between 55 mm and 60 mm. The amount of water to be added was determined on the basis of an amount of water providing that standard consistency.

The setting time was determined according to the setting time testing of JIS T 6601. A sample was filled in a metal-made cylindrical mould of 30 mm in inner diameter and 30 mm in height. The setting time was then expressed in terms of a period from the time of start of kneading to the time at which a 300 gf-loaded Vicat needle (having an area of 1 $mm^2$) was barely indented through the sample by a depth of 1 mm.

The compressive strength was also measured according to the compressive strength testing of JIS T 6601. A sample kneaded to the standard consistency was filled in a metal-made cylindrical mould of 30 mm in inner diameter and 60 mm in height, and was set to such a degree that it could stand up to handling. Thereafter, the sample was removed from the mould, and was then allowed to stand at room temperature. Twenty-four (24) hours after the start of kneading, the compressive strength was determined by the crushing at a loading rate of 1 mm per minute.

The storage stability was determined according to the accelerated aging testing wherein a polyethylene bag having therein an investment powder sample was stored for 60 days in a constant-temperature and -humidity vessel maintained inside at a temperature of 37° C. and a humidity of 100%. After accelerated aging, measurement was made of the setting time and consistency of an investment sample kneaded at the standard water mixing ratio. The storage stability was then expressed in terms of a delay time in minute and an increased consistency in mm obtained by subtracting the setting time and consistency predetermined before accelerated aging by the same procedures from the aforesaid measurements.

The low-dusting properties were estimated on the basis of the weight concentration of dust. Two hundreds (200) grams of a sample were charged in a metal-made cylindrical can ($\phi 150 \times 160$ mm), which was in turn vertically shaken five times at a rate of one reciprocation per second, immediately followed by encapping. Just thereafter, the measurement of dust released from within the can was initiated with a digital type dust meter P-3 (manufactured by Shibata Kagaku, Co., Ltd.), and was continued for 3 minutes to determine the weight concentration of dust. The results are set forth in the following table.

| No. | | Composition Components | Weight (%) | Standard Amount of Water (ml)* | Setting Time Before Accelerated Aging | Setting Time After Accelerated Aging | Consistency Before Accelerated Aging (mm) | Consistency After Accelerated Aging (mm) | Storage Stability Delay Time | Storage Stability Increased Consistency (mm) | Compressive Strength (Kgf/cm²) | Weight Concentration of Dust (mg/m³) |
|---|---|---|---|---|---|---|---|---|---|---|---|---|
| 1 | Example | Hemihydrate Gypsum<br>Christobalite<br>Pristane<br>Sodium Lauryl Sulfate | 30<br>67.25<br>2.5<br>0.25 | 33 | 12 min 00 sec | 13 min 45 sec | 58.6 | 59.5 | 1 min 45 sec | 0.9 | 62 | 1.27 |
| 2 | Example | Hemihydrate Gypsum<br>Christobalite<br>Isopropyl Palmitate<br>Sodium Myrystyl Sulfate | 30<br>67.25<br>2.5<br>0.25 | 33 | 12 min 15 sec | 13 min 15 sec | 58.5 | 59.8 | 1 min 00 sec | 1.3 | 60 | 1.25 |
| 3 | Example | Hemihydrate Gypsum<br>Christobalite<br>Liquid Paraffin<br>Sodium Dodecylbenzene Sulfonate | 30<br>69.48<br>0.5<br>0.02 | 33 | 12 min 00 sec | 13 min 45 sec | 58.3 | 60.0 | 1 min 45 sec | 1.7 | 64 | 1.28 |
| 4 | Example | Hemihydrate Gypsum<br>Quartz<br>Squalane<br>Sodium Stearyl Sulfate | 30<br>67.25<br>2.5<br>0.25 | 33 | 12 min 15 sec | 14 min 00 sec | 59.0 | 60.5 | 1 min 45 sec | 1.5 | 58 | 1.29 |
| 5 | Example | Hemihydrate Gypsum<br>Quartz<br>Isopropyl Palmitate<br>Sodium Cetyl Sulfate | 30<br>67.25<br>2.5<br>0.25 | 33 | 12 min 00 sec | 13 min 45 sec | 58.2 | 60.3 | 1 min 45 sec | 2.1 | 57 | 1.28 |
| 6 | Example | Hemihydrate Gypsum<br>Quartz<br>Liquid Paraffin<br>Sodium Lauryl Sulfate | 30<br>67.25<br>2.5<br>0.25 | 33 | 12 min 15 sec | 13 min 45 sec | 59.2 | 61.1 | 1 min 30 sec | 1.9 | 55 | 1.21 |
| 7 | Example | Hemihydrate Gypsum<br>Christobalite<br>Pristane<br>Sodium Lauryl Sulfate | 30<br>64.72<br>4.8<br>0.48 | 33 | 12 min 00 sec | 13 min 45 sec | 58.6 | 60.4 | 1 min 45 sec | 1.8 | 63 | 1.20 |
| 8 | Example | Hemihydrate Gypsum<br>Quartz<br>Isopropyl Palmitate<br>Sodium Cetyl Sulfate | 30<br>64.72<br>4.8<br>0.48 | 33 | 12 min 15 sec | 13 min 45 sec | 58.0 | 59.8 | 1 min. 30 sec | 1.8 | 54 | 1.24 |
| 9 | Example | Christobalite<br>Quartz<br>Magnesium Oxide<br>Primaryammonium Phosphate<br>Isopropyl Palmitate<br>Squalane | 69.25<br>11<br>8<br>9<br>1.25<br>1.25 | 24 | 20 min 00 sec | 21 min 45 sec | 50.0 | 52.0 | 1 min 45 sec | 2.0 | 108 | 1.28 |

-continued

| No. | | Composition | | Standard Amount of | Setting Time Before Accelerated | Setting Time After Accelerated | Consistency Before Accelerated | Consistency After Accelerated | Storage Stability | | Compressive Strength | Weight Concentration of Dust |
|---|---|---|---|---|---|---|---|---|---|---|---|---|
| | | Components | Weight (%) | Water (ml)* | Aging | Aging | Aging (mm) | Aging (mm) | Delay Time | Increased Consistency (mm) | (Kgf/cm$^2$) | (mg/m$^3$) |
| | | Sodium Dodecylbenzene Sulfonate | 0.12 | | | | | | | | | |
| | | Sodium Stearyl Sulfate | 0.13 | | | | | | | | | |
| 10 | Example | Hemihydrate Gypsum | 30 | 33 | 12 min 00 sec | 14 min 00 sec | 59.5 | 61.9 | 2 min 00 sec | 2.4 | 58 | 1.23 |
| | | Christobalite | 30 | | | | | | | | | |
| | | Quartz | 37.25 | | | | | | | | | |
| | | Pristane | 2.5 | | | | | | | | | |
| | | Sodium Lauryl Sulfate | 0.25 | | | | | | | | | |
| 11 | Comparison Example | Hemihydrate Gypsum | 30 | 33 | 12 min 15 sec | 20 min 45 sec | 59.0 | 69.8 | 8 min 30 sec | 10.8 | 55 | 7.34 |
| | | Christobalite | 70 | | | | | | | | | |
| 12 | Comparison Example | Hemihydrate Gypsum | 30 | 33 | 12 min 30 sec | 21 min 45 sec | 58.5 | 70.3 | 9 min 15 sec | 11.8 | 52 | 7.38 |
| | | Quartz | 70 | | | | | | | | | |
| 13 | Comparison Example | Christobalite | 72 | 24 | 20 min 15 sec | 30 min 00 sec | 50.0 | 67.5 | 9 min 45 sec | 17.5 | 100 | 7.19 |
| | | Quartz | 11 | | | | | | | | | |
| | | Magnesium Oxide | 8 | | | | | | | | | |
| | | Primaryammonium Phosphate | 9 | | | | | | | | | |
| 14 | Comparison Example | Hemihydrate Gypsum | 30 | 33 | 12 min 30 sec | 22 min 00 sec | 58.4 | 70.7 | 9 min 30 sec | 12.3 | 50 | 7.25 |
| | | Christobalite | 30 | | | | | | | | | |
| | | Quartz | 40 | | | | | | | | | |

*The standard amount of water is expressed in terms of ml per 100 grams of powder.

EFFECT OF THE INVENTION

In the compositions of Comparison Examples 11, 12, 13 and 14 wherein use was not made of one or more wetting agents selected from the group consisting of the liquid hydrophobic hydrocarbons, liquid hydrophobic fatty acid esters and liquid hydrophobic fatty acids, all showing a vapor pressure of 3.15 mm Hg or below at 20° C. and one or more anionic surface active agents selected from the group consisting of alkylbenzene sulfonates and alkyl sulfates, the weight concentration of dust did all exceeded 7.19 mg/m$^3$. This implies that, with such investment compositions, there is a possibility that environmental pollution may take place due to dusting, when they are emptied from one container to another, or weighed. In the compositions of Examples 1 to 10 inclusive wherein the wetting and anionic surface active agents were added in the specific proportions, the weight concentration of dust was all decreased to up to 1.29 mg/m$^3$. This indicates that, with such investment compositions, it is very unlikely that environmental pollution may be caused, when they are emptied from one container to another, kneaded or weighed.

Further referring to the storage stability (expressed in terms of a difference between the setting time before accelerated aging and the setting time of the sample after accelerated aging and a difference between the consistency before accelerated aging and the consistency of the sample after accelerated aging), Comparison Examples 11, 12, 13 and 14, wherein the aforesaid wetting and anionic surface active agents were not added at all, showed setting time lags of 8 minutes 30 seconds, 9 minutes 15 seconds, 9 minutes 45 seconds and 9 minutes 30 seconds, respectively, whereas Examples 1 to 10 inclusive, wherein the wetting and anionic surface active agents were added in the specific proportions, each showed a setting time lag of within 2 minutes. Turning to the consistency, the compositions of Comparison Examples 11 to 14 inclusive, wherein the wetting and anionic surface active agents were not added at all, had their consistency increased to 10.8 mm, 11.8 mm, 17.5 mm and 12.3 mm, respectively, whereas the compositions of Examples 1 to 10 inclusive, wherein the wetting and anionic surface active agents were added in the specific proportions, each showed an increase of within 2.4 mm; this means that their storage stability was extremely improved. Therefore, an operator could obtain dental investments having low-dusting properties and stable physical properties after storage.

The investment composition of Comparison Example 11, wherein hemihydrate gypsum was used as the main component, christobalite was used as the refractory, and the wetting and anionic surface active agents were not added at all, showed a compressive strength of 55 Kgf/cm$^2$, whereas the composition of Example 1, 2, 3 or 7, wherein the same main components were used, and the wetting and anionic surface active agents were added in the specific proportions, showed a compressive strength of 62 Kgf/cm$^2$, 60 Kgf/cm$^2$, 64 Kgf/cm$^2$ or 63 Kgf/cm$^2$. The investment composition of Comparison Example 12, wherein hemihydrate gypsum was used as the main component, quartz was used as the refractory, and the wetting and anionic surface active agents were not added at all, showed a compressive strength of 52 Kgf/cm$^2$, whereas the composition of Example 4, 5, 6 or 8, wherein the same main components were used, and the wetting and anionic surface active agents were added in the specific proportions, showed a compressive strength of 58 Kgf/cm$^2$, 57 Kgf/cm$^2$, 55 Kgf/cm$^2$ and 54 Kgf/cm$^2$. The investment composition of Comparison Example 14, wherein hemihydrate gypsum was used as the main component, christobalite and quartz were employed as the refractories, and the wetting and anionic surface active agents were not added at all, showed a compressive strength of 50 Kgf/cm$^2$, whereas the investment composition of Example 10, wherein the same main components were used, and the wetting and anionic surface active agents were added in the specific proportions, exhibited a compressive strength of 58 Kgf/cm$^2$. Referring to the investment composition of Comparison Example 13 which was used for a high melting-point alloy, comprised christobalite, quartz, magnesium oxide and primaryammonium phosphate, and was kneaded with a colloidal silica, and wherein the wetting and anionic surface active agents were not added at all, its compressive strength was 100 Kgf/cm$^2$. However, the investment composition of Example 9, wherein the same main components were used, and the wetting and anionic surface active agents were added in the specific proportions, showed a compressive strength of 108 Kgf/cm$^2$. It is thus found that, in spite of the same main components used, the investment compositions according to the present invention all show an improved compressive strength compared with those of the Comparison Examples wherein the wetting and anionic surface active agents were not added whatsoever.

As explained in detail in the foregoing, the dental powdery investments of the Comparison Examples, wherein any wetting and anionic surface active agents are not used, give rise to a fear of environmental pollution due to dusting and a lowering of storage stability due to a delay in its setting time and an increase in consistency after accelerated aging. It is found, however, that the inventive dental investment compositions in the low-dusting powdery form show little sign of dusting, excel in storage stability and no sign of a decrease in compressive strength. This indicates that the invented compositions have much more improved dental investment properties.

It is to be understood that while the present invention has been described with reference to the specific embodiments, many modifications or changes may be maded without departing from the scope defined in the appended claims.

What is claimed is:

1. A low-dusting powder dental investment composition, consisting essentially of:
    (a) a binder which is (1) a mixture of a soluble phosphate with magnesium oxide, or (2) a hemihydrate gypsum;
    (b) a refractory material which is at least one member selected from the group consisting of quartz and cristobalite;
    (c) 0.50 to 5.00 parts by weight of a wetting agent which is at least one member selected from the group consisting of liquid hydrophobic hydrocarbons, liquid hydrophobic fatty acid esters, isosteric acid, oleic acid, linolenic acid, linoleic acid, 2-ethylpentanoic acid, and 2-ethylhexanoic acid; wherein said wetting agent has a vapor pressure of 3.15 mm Hg or below at 20° C.;
    (d) 0.01 to 0.50 parts by weight of an anionic surface active agent which is at least one member selected from the group consisting of alkylbenzene sulfonates and alkyl sulfates; and (e) a setting controlling agent in an amount of from 0% and up to an amount effective for setting controlling;

wherein the total amount of components (a), (b), (c), (d) and (e) adds up to 100 parts by weight.

2. The low-dusting powder dental investment composition of claim 1, wherein said liquid hydrophobic hydrocarbon is one member selected from the group consisting of pristane, squalane, liquid paraffin, an α-olefin oligomer, nonane, decane, undecane, dodecane and tridecane.

3. The low-dusting powder dental investment composition of claim 1, is one member selected from the group consisting of isopropyl myristate, isopropyl linoleate, isopropyl palmitate, hexyl laurate, isopropyl isostearate, butyl isostearate, ethyl linoleate, ethyl olive-oleate, cetyl isooctanoate, hexyldecyl myristate, hexyldecyl stearate, isostearyl palmitate, hexyldecyl isostearate, octyldodecyl neodecanoate, diethyl sebacate, diisopropyl sebacate and diisopropyl adipate.

4. The low-dusting powder dental investment composition of claim 1, wherein said alkyl sulfate is one member selected from the group consisting of sodium lauryl sulfate, potassium lauryl sulfate, sodium myristyl sulfate, sodium cetyl sulfate, and sodium stearyl sulfate.

5. The low-dusting powder dental investment composition of claim 1, wherein said alkylbenzene sulfonate is sodium dodecylbenzene sulfonate.

6. The low-dusting powder dental investment composition of claim 1, containing a setting controlling agent.

7. The low-dusting powder dental investment composition of claim 6, wherein said setting controlling agent is an inorganic salt or an alkali and finely divided dihydrate gypsum setting accelerator.

8. The low-dusting powder dental investment composition of claim 6, wherein said setting controlling agent is a setting retarder.

9. The low-dusting powder dental investment composition of claim 1, wherein said binder is a mixture of a soluble phosphate with magnesium oxide.

10. The low-dusting powder dental investment composition of claim 1, wherein said binder is a hemihydrate gypsum.

11. The low-dusting powder dental investment composition of claim 1, wherein said refractory material is a quartz.

12. The low-dusting powder dental investment composition of claim 1, wherein said refractory material is a christobalite.

13. The low-dusting powder dental investment composition of claim 1, wherein said anionic surface active agent is an alkylbenzene sulfonate.

14. The low-dusting powder dental investment composition of claim 1, wherein said anionic surface active agent is an alkyl sulfate.

* * * * *